US008605601B2

(12) United States Patent
Isaksson et al.

(10) Patent No.: US 8,605,601 B2
(45) Date of Patent: Dec. 10, 2013

(54) ALARM AND EVENT COORDINATION BETWEEN TELECOM NODES

(75) Inventors: Niklas Isaksson, Molnlycke (SE); Magnus Standar, Floda (SE); Andreas Olsson, Stockholm (SE); Per Stahle, Vallentuna (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 260 days.

(21) Appl. No.: 12/922,335

(22) PCT Filed: Mar. 14, 2008

(86) PCT No.: PCT/SE2008/050285
§ 371 (c)(1),
(2), (4) Date: Sep. 13, 2010

(87) PCT Pub. No.: WO2009/113929
PCT Pub. Date: Sep. 17, 2009

(65) Prior Publication Data
US 2011/0090800 A1    Apr. 21, 2011

(51) Int. Cl.
*H04W 4/00*    (2009.01)
(52) U.S. Cl.
USPC .......................... 370/242; 709/223; 709/224
(58) Field of Classification Search
USPC ........... 370/216–228, 241–253; 709/223–224
See application file for complete search history.

(56) References Cited

U.S. PATENT DOCUMENTS

2004/0221026 A1* 11/2004 Dorland ...................... 709/223
2006/0107086 A1    5/2006 Walker et al.
2006/0294214 A1* 12/2006 Chou ........................... 709/223
2007/0177523 A1*  8/2007 Nagami et al. ............... 370/252
2007/0222576 A1    9/2007 Miller et al.

OTHER PUBLICATIONS

Hsin et al, Self-Monitoring of Wireless Sensor Networks, Computer Communications, Feb. 15, 2005.*
Mengjie, Y., et al., "Fault Management in Wireless Sensor Networks", IEEE Wireless Communications, Dec. 2007, pp. 13-19.
Communication pursuant to Article 94(3) EPC, in corresponding European Application No. 087242327-1862, dated Feb. 20, 2013, 7 pages.
Reich, "Diplomarbeiten", Feb. 8, 2013, 4 pages.

* cited by examiner

*Primary Examiner* — Charles C Jiang
(74) *Attorney, Agent, or Firm* — Rothwell, Figg, Ernst & Manbeck, P.C.

(57) ABSTRACT

A telecom node (210, 310) such as a base station is configured to detect events. A low priority event may not be serious enough on its own to raise an alarm to a network management system (220, 420) managing the telecom node (210, 310). However, the low priority event can collectively have a serious impact on the network performance if the event occurs over multiple nodes (210, 310) of the network (200). When a low priority event occurs over multiple nodes (210, 310), the telecom node (210, 310) notifies the network management system (220, 420) of the event by raising an alarm so that the situation can be addressed. In a partitioned network installation, not all neighboring nodes (210, 310) are managed by a same network management system (220, 420). When the alarm is raised to the network management system (220, 420), other network management systems (220, 420) managing the neighboring nodes (210, 310) are notified of the alarm by the network management system (220, 420).

18 Claims, 11 Drawing Sheets

ALARM AND EVENT COORDINATION BETWEEN TELECOM NODES

CROSS-REFERENCE TO RELATED APPLICATION

This application is a 35 U.S.C. §371 National Phase Entry Application from PCT/SE2008/050285, filed Mar. 14, 2008, and designating the United States.

TECHNICAL FIELD

The technical field of this disclosure generally relates to systems and methods for managing events and resulting alarms that occur across multiple telecommunications (or simply telecom) nodes.

BACKGROUND

In a telecom network, multiple base stations provide services to end users on mobile terminals. The base stations can also be partitioned and each partitioned group of base stations are managed by a network management system. FIG. 1A illustrates a simplified network 100 that includes base stations 110-1, 110-2 and a network management system 120 (or simply "NMS"). The base stations 110-1, 110-2 provide wireless communications services to end users on mobile terminals 130-1, 130-2 and 130-3. The base stations 110-1, 110-2 are connected to a core network (not shown) so that voice and data services (such as VoIP and multimedia streaming) can be provided to the mobile terminals 130-1, 130-2 and 130-3.

During operation, many events are generated and processed in the network 100. An event is a generic term for any type of occurrence that occurs within a network entity such as the base station. For example, when the mobile terminal 130-1 enters a service area of the base station 110-1 and a communication link is established between the mobile terminal 130-1 and the base station 110-1, a communication-synchronization event can be generated to mark the process that establishes the communication link. The communication-synchronization event information can include, among others, the identity of the mobile terminal 130-1 and the time when the communication link was established. This information can be used for billing purposes and also to gather statistics for analysis.

An important category of events is events caused by fault states, i.e., abnormal conditions existing in the network. The state that triggers the event may be temporary in a sense that the condition that caused the event ceases to exist without any intervention. For example, the base station's 110-1 capacity may be exceeded when there are too many mobile terminals requesting connection services. As a result, a capacity-exceeded event may be triggered by the base station 110-1. However, as the mobile terminals 130 leave the area served by the base station 110-1, the demand for services will fall below the capacity threshold.

Some fault states may automatically be corrected or at least automatically mitigated. As an example, the base station 110-1 may provide VoIP services through two boards—the primary board and the backup board—each capable of handling the VoIP data traffic. If the primary board stops functioning, an event related to the failure of the primary board is triggered. However, because of the redundancy provided by the backup board, the VoIP service can be restored automatically. In another situation, both boards may be used to provide the VoIP services. When one board fails, the VoIP services can still be provided, but at a reduced capacity—50% in this instance.

In extreme circumstances, resolving the faulty states require manual intervention. For example, if there is only a single board providing the VoIP services and the board fails (board-failure event), the base station 110-1 can no longer provide the service until the board is replaced or repaired.

When the event is generated and/or detected by the base stations 110-1 and/or 110-2, the event is filtered. Filtering is a process in which a decision is made on whether to raise an alarm corresponding to the event or not. In the example above where the base station 110-1 generates the capacity-exceeded event due to too many mobile terminals requesting services, the condition may last only a short time such as 30 seconds. In this instance, the base station 110-1 may decide not to raise an alarm to the next level—that is the base station 110-1 may decide not to notify the network management system 120.

However, if the condition lasts a significant amount of time such as over 5 minutes, the base station 110-1 may raise the alarm to the network management system 120 so that load balancing procedures may be carried out to establish an acceptable service level for the network. If the event indicates a complete service disruption, then the base station 110-1 raises an alarm to the network management system 120. The network management system 120 in turn may automatically notify a technician so that the situation can be investigated and corrected as necessary.

To process the alarms and events, the base stations as well as the network management system include alarm and event handling functions as illustrated in FIG. 1B, which provides a functional view of the network 100 illustrated in FIG. 1A. In FIG. 1B, the base stations 110-1 and 110-2 includes RBS event handlers 115-1 and 115-2, respectively, for performing the event handling functions. The network management system 120 includes a NMS alarm handler 125. Each RBS event handler 115-1, 115-2 is connected to the NMS alarm handler 125. The mobile terminals are not illustrated in FIG. 1B to minimize clutter so that understandability is enhanced.

Focusing on the RBS event handler 115-1, when an event occurs, the RBS event handler 115-1 decides whether an alarm should be raised to the network management level. If so, the RBS event handler 115-1 raises the alarm by notifying the NMS alarm handler 125 pointing out the malfunctioning subject.

FIG. 1C illustrates a conventional method M100 of handling events performed by the RBS event handler 115-1. In method M100, the RBS event handler 115-1 detects an event in act A110. In act A120, the RBS event handler 115-1 determines if the event is severe enough to be raised as an alarm to the next level—i.e., the event is filtered. If so, then the RBS event handler 115-1 raises an alarm corresponding to the event to the network management system 120 in act A130.

The reason that conventional event handlers such as the RBS event handler 115-1 filters events is explained as follows. In conventional networks, supervision of nodes is performed from centralized operational centers. The network management system 120 illustrated in FIG. 1A is one such operational center. When an event occurs that can have impact on the performance of the network, a network node (e.g., the base station) raise an alarm to notify the operational center. A typical network has many nodes and each node may detect many events. Since the number of events can be substantial, each node filters the events so an operator working at the operational center is not inundated with insubstantial or low priority events that may take away focus from more severe faults.

The conventional event handlers perform satisfactorily to filter the events on a node by node level. However, the conventional event handlers are inadequate in that they over-filter events that should properly be raised as alarms to the operational centers. An event that is individually trivial or low priority to a single node can sum up to indicate a severe fault requiring attention if the event occurs across multiple nodes in an area. As an example, assume that both base stations 110-1 and 110-2 illustrated in FIG. 1A are each outfitted with five boards providing VoIP services. Also assume that one VoIP board from each base station 110-1, 110-2 restarts so that the VoIP service capacity momentarily is reduced to 80% for each. Since each base station 110-1, 110-2 can still provide the VoIP services, each event is not raised to the network management system 120.

However, it may be that both boards subject to the restart are from a particular product line of a vendor and the restart reasons are due to flaws that are particular to that product line. The flaw may be in the board's firmware, on-board processor version, thermal tolerance, etc. If such information is known, then preventive actions may be taken (not installing the same type of hardware boards to other base stations) and the product vendor may be notified so that the issues with the boards are addressed. But since the conventional event handler withholds the information (with good intentions), it is difficult to analyze the situation and to take corrective actions.

As another example, a base station may be subjected to multiple failed attach requests when a mobile terminal tries to register itself to the mobile network. This normally will not cause the base station to raise an alarm, as this is expected from time to time due to mobile terminals trying to attach under poor radio environmental circumstances. However, if multiple neighbors experience the same multiple failed attach requests, this common experience can indicate a malfunctioning mobile terminal or an environmental disturbance that needs to be addressed. But again, the conventional event handler withholds the information and corrective actions are not taken as a result.

SUMMARY

One or more non-limiting example embodiments address the short comings of the conventional alarm and event handlers. In an embodiment, an event is detected, for example, by a node (such as a base station) of a telecom network. The detected event is analyzed to determine whether the event is severe enough of its own to raise an alarm—whether the event exceeds a predetermined severity threshold. If the event exceeds the predetermined severity threshold, an alarm corresponding to the event is raised to the next level as an alarm, i.e., the node notifies a network management system managing the node of the event.

If the event does not exceed the predetermined severity threshold—i.e., is not severe enough on its own—then the node determines whether neighboring nodes have detected the same event or another event related to the event. If enough—i.e., a predetermined number of—neighboring nodes have detected the same or the related event, then the alarm is raised to the next level—the network management system is notified—by the node. In effect, the severity of the event is raised enough to notify the network management system. In this way, the low priority events that collectively have a severe impact on the network performance are detected and addressed.

In an embodiment, the node records the event, for example in a local storage. In another embodiment, a threshold of the predetermined number of nodes required to raise an alarm to the next level corresponding to the event can be individualized for each event. As an optional additional layer of filtering, the alarm corresponding to the event is raised when the predetermined number of neighbors have detected the same or the related event within a predetermined duration of each other. An event is determined to be related to another event based on whether there is potentially a common cause for both events, or both the events affect the same offered service.

In determining whether the neighboring nodes have detected the same or a related event, the neighboring nodes are polled for the information. The neighboring nodes can be polled individually or polled substantially simultaneously with a multicast message using a logical communication interface. In EUTRAN systems for example, the X2 communication interface can be used for communication between nodes such as between base stations.

In an embodiment, the nodes are partitioned into groups of nodes and each group is managed by a corresponding network management system. If any of the neighboring nodes is managed by another network management system, then the current network management system can notify the other network management system of the raised alarm so that alarm can be managed throughout the partitions. The notification can be accomplished through a NMS peer-to-peer communication interface. This broadens the knowledge base to act on when taking actions to solve network problems.

BRIEF DESCRIPTION OF THE DRAWINGS

The foregoing and other objects, features, and advantages will be apparent from the following more particular description of preferred non-limiting example embodiments as illustrated in the accompanying drawings in which reference characters refer to the same parts throughout the various views. The drawings are not necessarily to scale, emphasis instead being placed upon illustrating the principles of the invention.

DETAILED DESCRIPTION

In the following description, for purposes of explanation and not limitation, specific details are set forth such as particular architectures, interfaces, techniques, etc. in order to provide a thorough understanding of the present invention. However, it will be apparent to those skilled in the art that the present invention may be practiced in other embodiments that depart from these specific details. Those skilled in the art will be able to devise various arrangements which, although not explicitly described or shown herein, embody the principles of the invention and are included within its spirit and scope.

In some instances, detailed descriptions of well-known devices, circuits, and methods are omitted so as not to obscure the description of the present invention with unnecessary detail. All statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, it will be appreciated that block diagrams herein can represent conceptual views of illustrative circuitry embodying the principles of the technology. Similarly, it will be appreciated that any flow charts, state transition diagrams, pseudocode, and the like represent various processes which may be substantially represented in computer readable medium and so executed by a computer or processor, whether or not such computer or processor is explicitly shown.

The functions of the various elements including functional blocks labeled or described as "processors" or "controllers" may be provided through the use of dedicated hardware as well as hardware capable of executing software in association with appropriate software. When provided by a processor, the functions may be provided by a single dedicated processor, by a single shared processor, or by a plurality of individual processors, some of which may be shared or distributed. Moreover, explicit use of the term "processor" or "controller" should not be construed to refer exclusively to hardware capable of executing software, and may include, without limitation, digital signal processor (DSP) hardware, read only memory (ROM) for storing software, random access memory (RAM), and non-volatile storage. Furthermore, the use of symbols (a), (b), (c), etc. in the claims are present merely for ease of reference, and are not meant to convey any specific order of the acts performed.

Figure 1A:
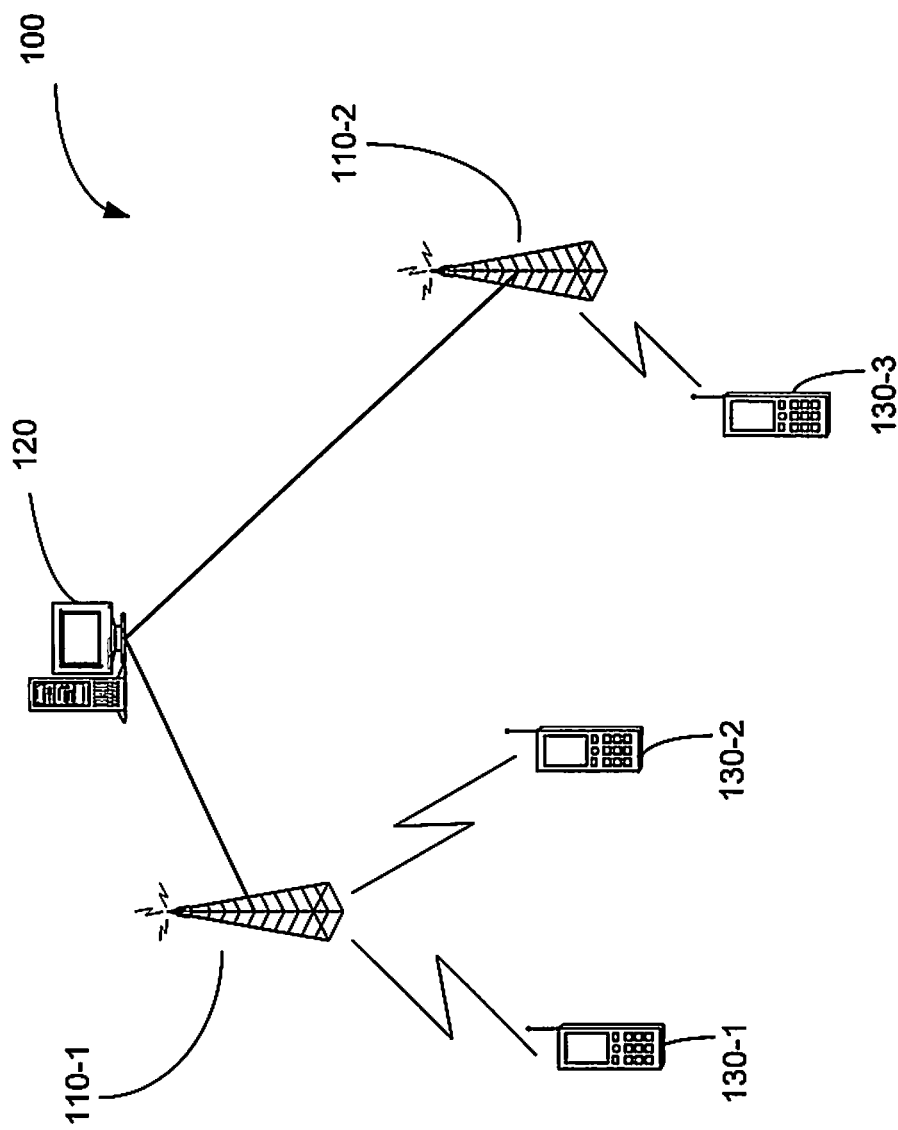
FIG. 1A illustrates a conventional telecom network for handling events.
Figure 1B:
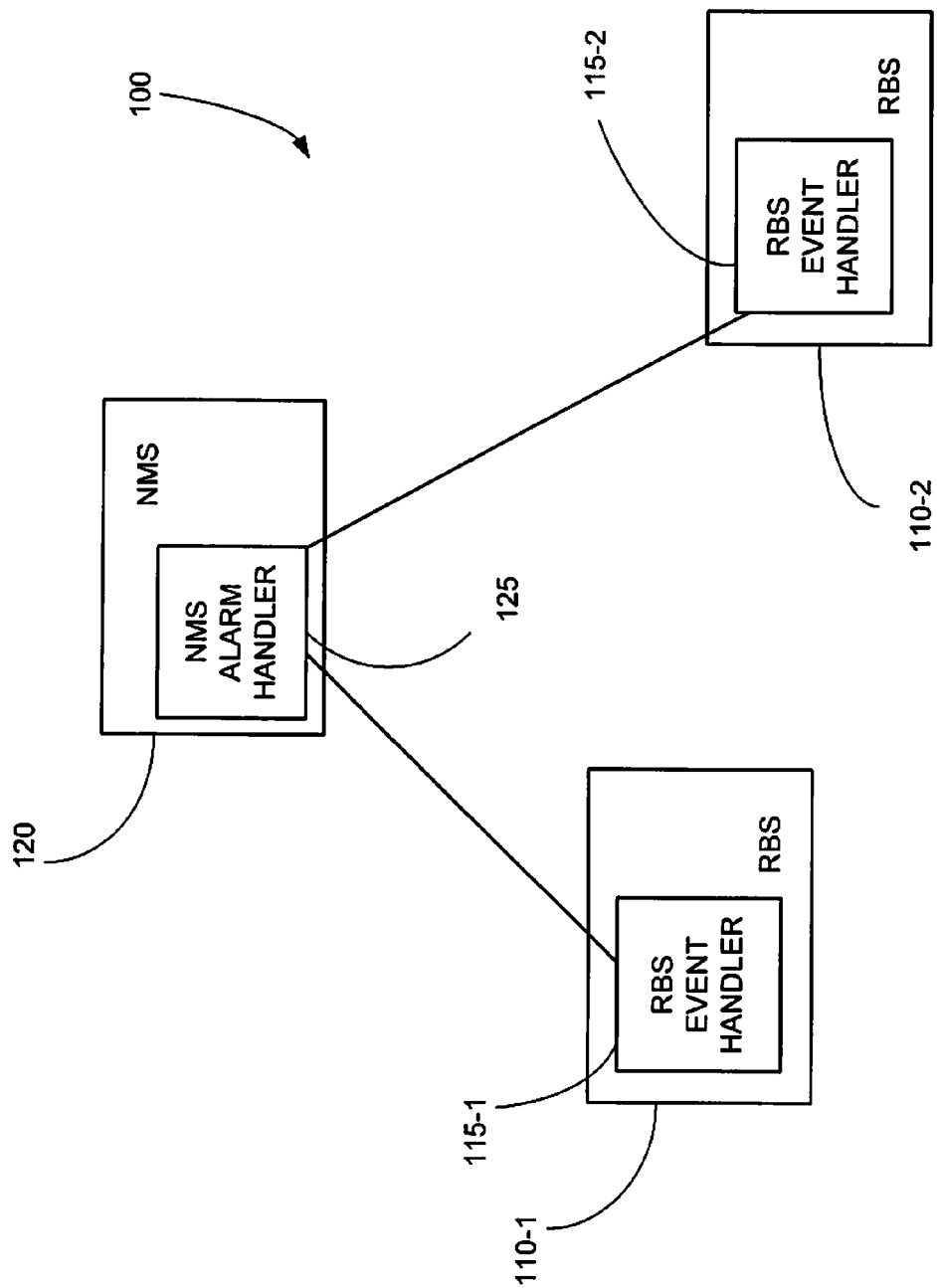
FIG. 1B illustrates a functional view of the conventional telecom network of FIG. 1A.
Figure 1C:
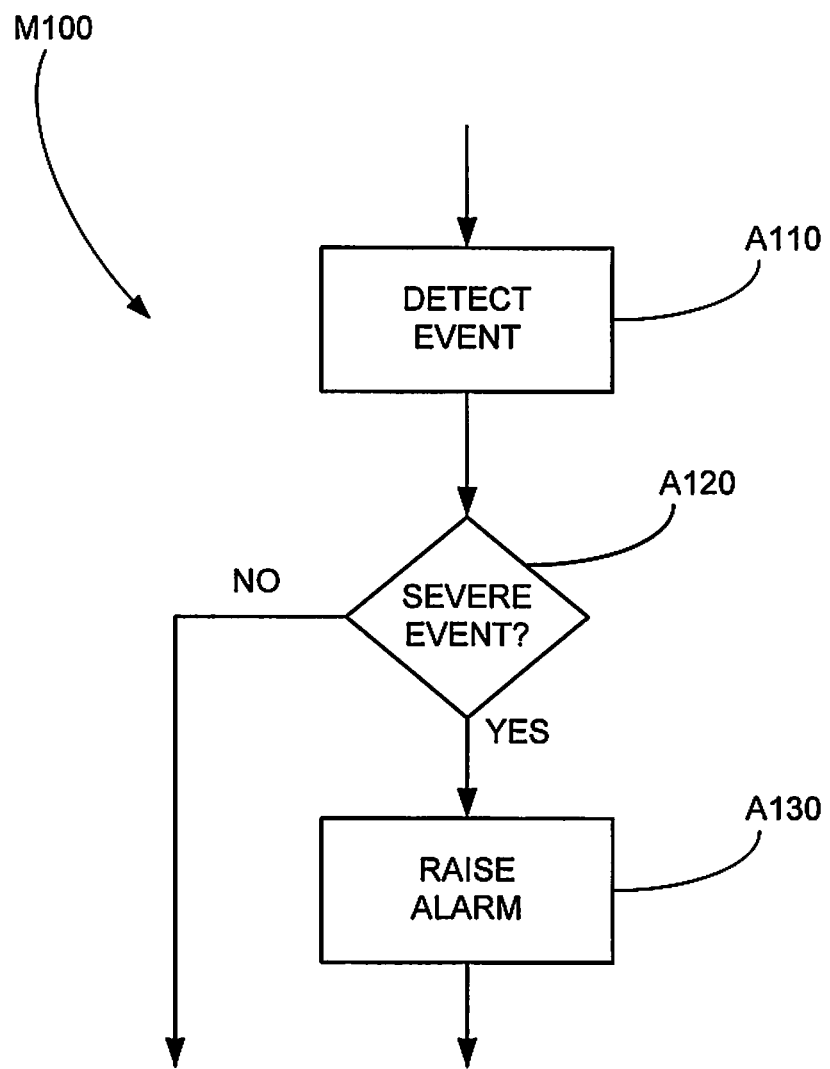
FIG. 1C illustrates a conventional method of event handling in a base station of the conventional telecom network.
Figure 2A:
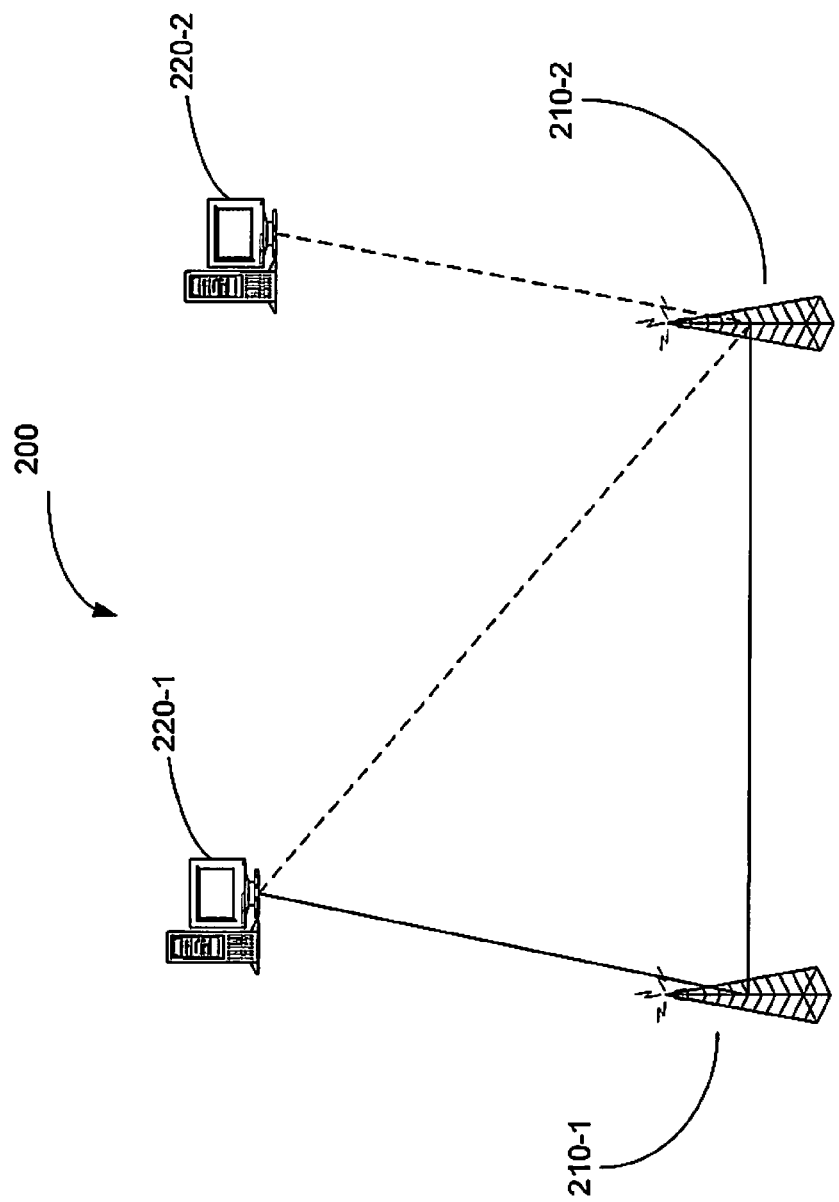
FIG. 2A illustrates a non-limiting example embodiment of a telecom network for alarm and event handling.

FIG. 2A illustrates a non-limiting example embodiment of a telecom network 200 for alarm and event handling. The telecom network 200 includes two telecom nodes 210-1 and 210-2 and two network management systems 220-1 and 220-2. The nodes 210-1 and 210-2 can be radio base stations (or simply base stations). The node 210-1 is managed by the network management system 220-1 (connection shown by a solid line). The node 210-2, which is a neighbor of the node 210-1, can be managed by either the network management 220-1 or 220-2 (connections shown as dashed lines). For ease of explanation, only two nodes and two network management systems are illustrated in FIG. 2A. However, a telecom network with any number of nodes and network management systems are contemplated.

Figure 2B:
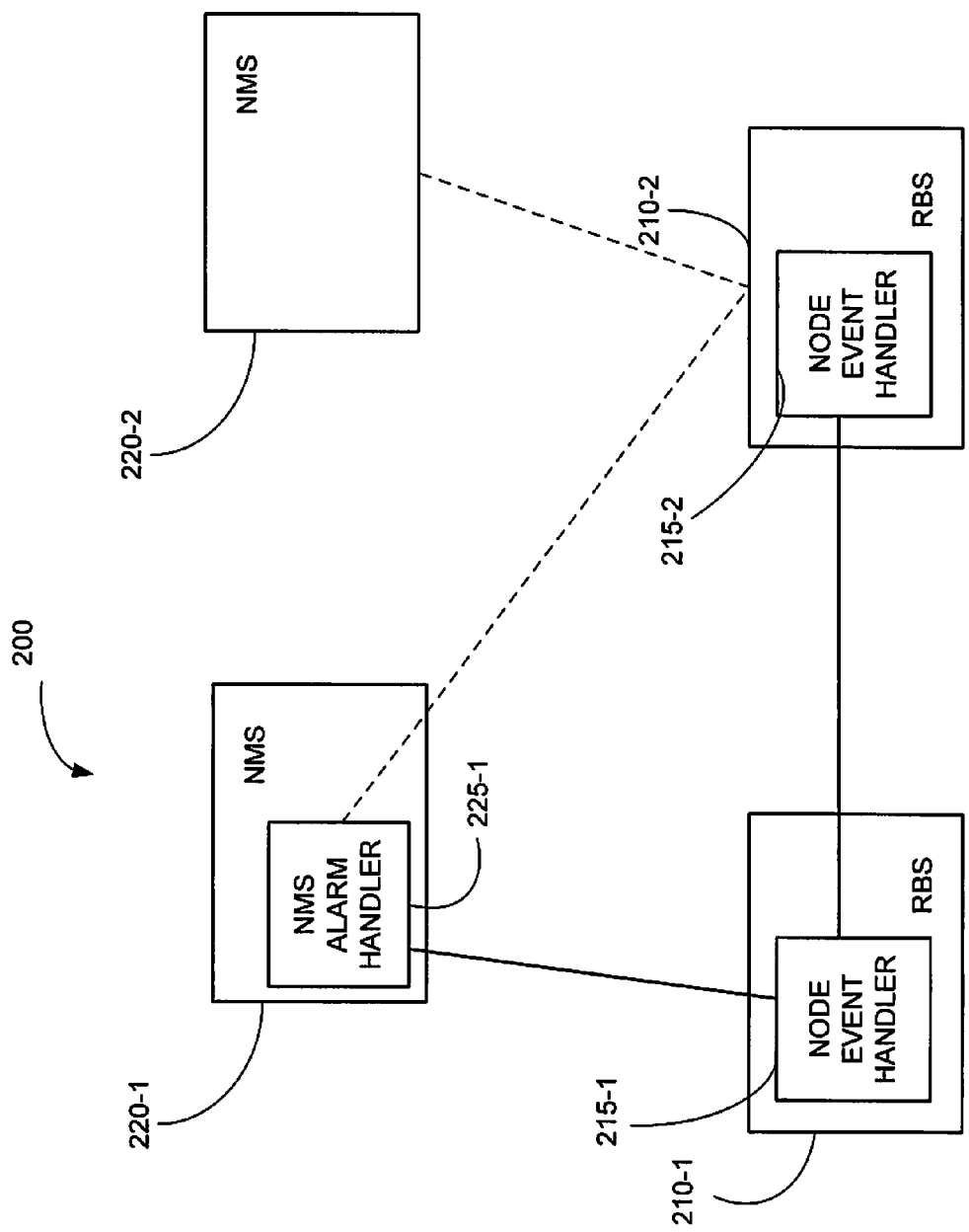
FIG. 2B illustrates a non-limiting example functional view of a telecom network for alarm and event handling.

FIG. 2B illustrates a non-limiting example functional view of the telecom network 200 illustrated in FIG. 2A. As shown, the nodes 210-1 and 210-2 each include node event handlers 215-1 and 215-2, respectively. The node event handler 215-1 is operatively connected to the node event handler 215-2 of the node 210-2. Any combination of wired and wireless links can be used to operatively connect the node event handlers 215-1 and 215-2 to each other. Examples of such links include fiber optics, copper, microwave, satellite, WiMax, and so on.

The node event handler 215-1 is also operatively connected to a NMS alarm handler 225-1 of the network management system 220-1. Again, any combination of wired and wireless links can be utilized for the connection between the node event handler 215-1 and the NMS alarm handler 225-1.

If the node 210-2 is managed by the network management system 220-1, then the node event handler 215-2 would be operatively connected to the NMS alarm handler 225-1. Otherwise, the node event handler 215-2 would be operatively connected to the alarm handler within the network management system 220-2.

Figure 2C:
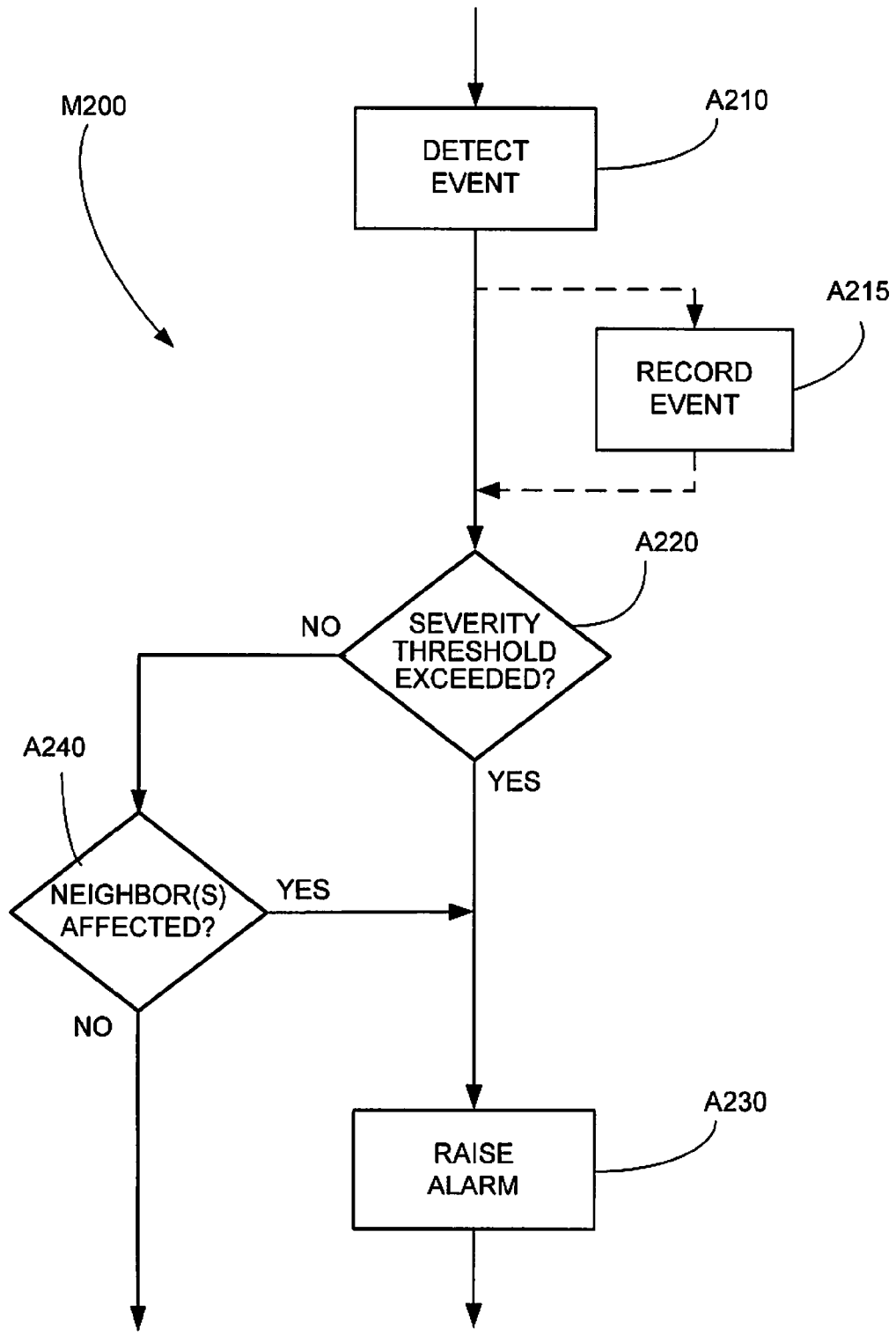
FIG. 2C illustrates a non-limiting example method of alarm and event handling in a node of a telecom network.

FIG. 2C illustrates a non-limiting example method of handling an event in a node of a telecom network. In the method M200, an event is detected in act A210. For example, the node 210-1, and more specifically, the node event handler 215-1 detects a capacity-exceeded event if there are too many mobile terminals requesting connection services and detects a VoIP-board-restart event when a board restarts. Optionally, the event can be recorded in a local storage of the node in act A215. This allows the node to report a history of events if queried, for example by the network management system managing the node or by a neighboring node. This also allows the node itself to perform an analysis if required.

In act A220, the node determines whether the event meets a predetermined severity threshold. That is, the node determines whether the event is severe enough on its own to warrant raising of an alarm corresponding to the event. If so, the alarm corresponding to the event is raised to the next level in act A230, i.e., the node notifies the network management system managing the node of the event.

If the event does not exceed the predetermined severity threshold—i.e., the event is not serious enough on its own—then in act A240, the node determines whether a predetermined number of one or more neighboring nodes have detected the same event or another event related to the event.

As clearly suggested, events experienced by the neighboring nodes need not be the same event experienced by the current node. Referring back to FIG. 2A and FIG. 2B, assume that the node event handler 215-1 has detected a VoIP-board-restart event and the neighboring node event handler 215-2 has detected a VoIP-service-disruption event. The service disruption may be due to a software failure, a firmware failure, a disruption in power, etc. But it can also be caused due to the VoIP board itself not functioning correctly. That is, the VoIP-board-restart event detected by the node 210-1 and the VoIP-service-disruption event detected by the neighboring node 210-2 potentially have a common cause or the two events affect the same offered service (VoIP in this instance). In other words, the events are related.

Referring back to FIG. 2C, if the predetermined number of neighboring nodes have detected the same or the related event, then the method proceeds to act A230 in which the alarm corresponding to the event is raised to the next level, for example by notifying the network management system managing the node of the event. In this way, low priority events that collectively have a severe impact on the network performance can be detected, and thus, be addressed.

Figure 3A:
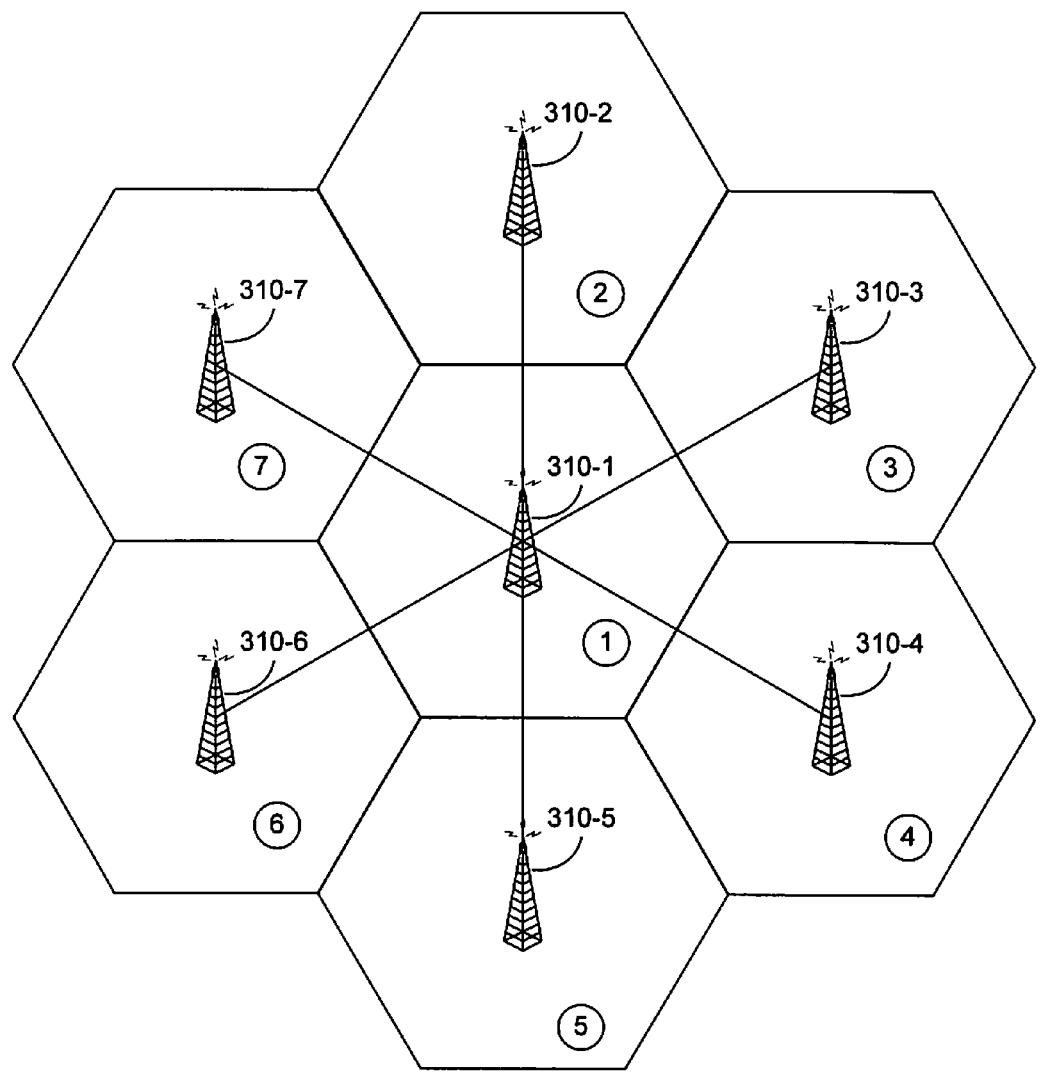
FIG. 3A illustrates a non-limiting example configuration of nodes neighboring each other.

As noted above, some events may be temporary such as the capacity-exceeded event. Due to the temporary nature of the event, even though multiple neighboring nodes may detect the same or the related event, not all nodes may be suffering from the cause of the event contemporaneously. This is explained with reference to FIG. 3A which illustrates a non-limiting example configuration of nodes neighboring each other. In FIG. 3A, seven nodes 310-1 to 310-7 serve respective service areas (or cells) 1-7 (expressed in circles). The nodes 310-2 to 310-7 are all neighbors of the node 310-1 in the center.

In one scenario, each node 310-1 to 310-7 may detect the capacity-exceeded event at one time or another, but not at the same time. For example, the node 310-6 may have too many mobile terminals requesting services in its service area 6. But as the mobile terminals move from service area 6 to service area 7, the condition causing the event no longer exists in area 6. Instead, the node 310-7 may detect the same capacity-exceeded event later in time.

When the node 310-1, having detected the capacity-exceeded event for itself, attempts to determine whether its neighbors have detected the events, it may conclude that both nodes 310-6 and 310-7 have detected the same capacity-exceeded event. If the predetermined number for raising an alarm for this event is set at two (that is, the alarm is raised as soon as the number is three or more), then the alarm corresponding to the capacity-exceeded event will be raised unnecessarily by the node 310-1 despite the fact that the condition no longer exist for the node 310-6 in reality.

Thus, in one embodiment, an alarm corresponding to an event is raised to the network management system when the predetermined number of neighboring nodes have detected the same or the related event within a predetermined duration of each other. In this manner, accumulation of temporary events is not raised unnecessarily as an alarm unless the conditions persist.

In another embodiment, the predetermined number of nodes detecting the same or the related event is individually set for each event. As a way of explanation, it may be that a first event occurring over three nodes is as severe as a second event occurring over ten nodes. By individually correlating (or setting) the predetermined number of nodes for each event, the severity of the events can be finally tuned. It can be deduced from above, that there can be several severity levels for alarms raised from events as well as for events such as "info", "warning", "minor", "major", "critical", and so on. Other ways of expressing severity levels including numeric expressions are also contemplated.

Referring back to FIG. 2B, the node event handlers 215-1 and 215-2 can be described to perform the following. When an event is reported, the node event handler analyzes and prioritizes the event. If necessary, the node event handler coordinates with the event handlers in its neighboring nodes. The correlation can trigger an alarm corresponding to the event to be raised to the network management system managing the node.

Figure 3B:
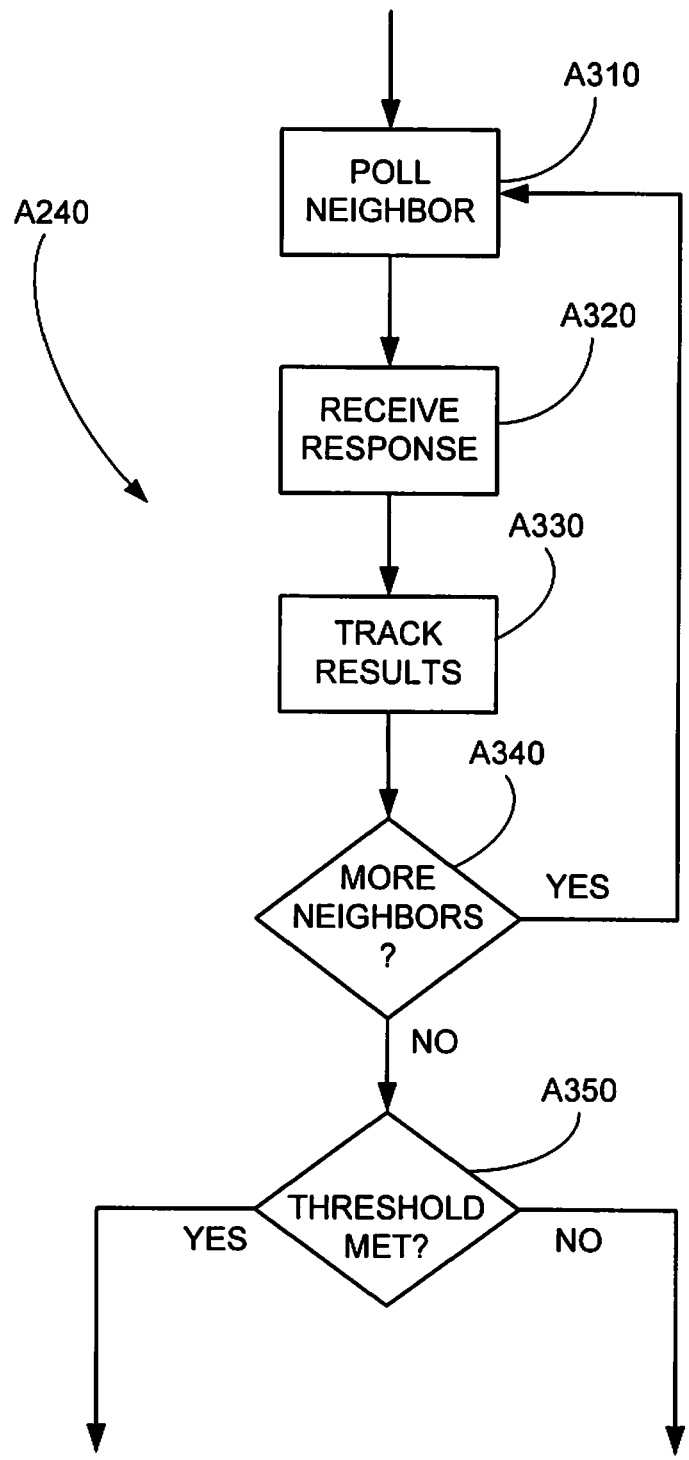
FIG. 3B illustrates a non-limiting example method of determining whether the neighboring nodes have detected related events.

To correlate the event with the neighboring nodes, i.e., to determine whether the predetermined number of neighboring nodes have detected the same or the related event, the node such as the base station 310-1 of FIG. 3A can perform an example method as illustrated in FIG. 3B. In this method, a neighboring node is polled in act A310 and a response is received in act A320. In act A330, the results are tracked, i.e., it is determined whether or not the polled neighbor has detected the same or the related event. Then in act A340, it is determined whether or not there are more neighbors to be polled. If so, the method proceeds to act A310 to repeat the polling and tracking process. If there are no more neighbors to be polled, then it is determined whether or not the threshold predetermined number of neighboring nodes is met in act A350.

Figure 3C:
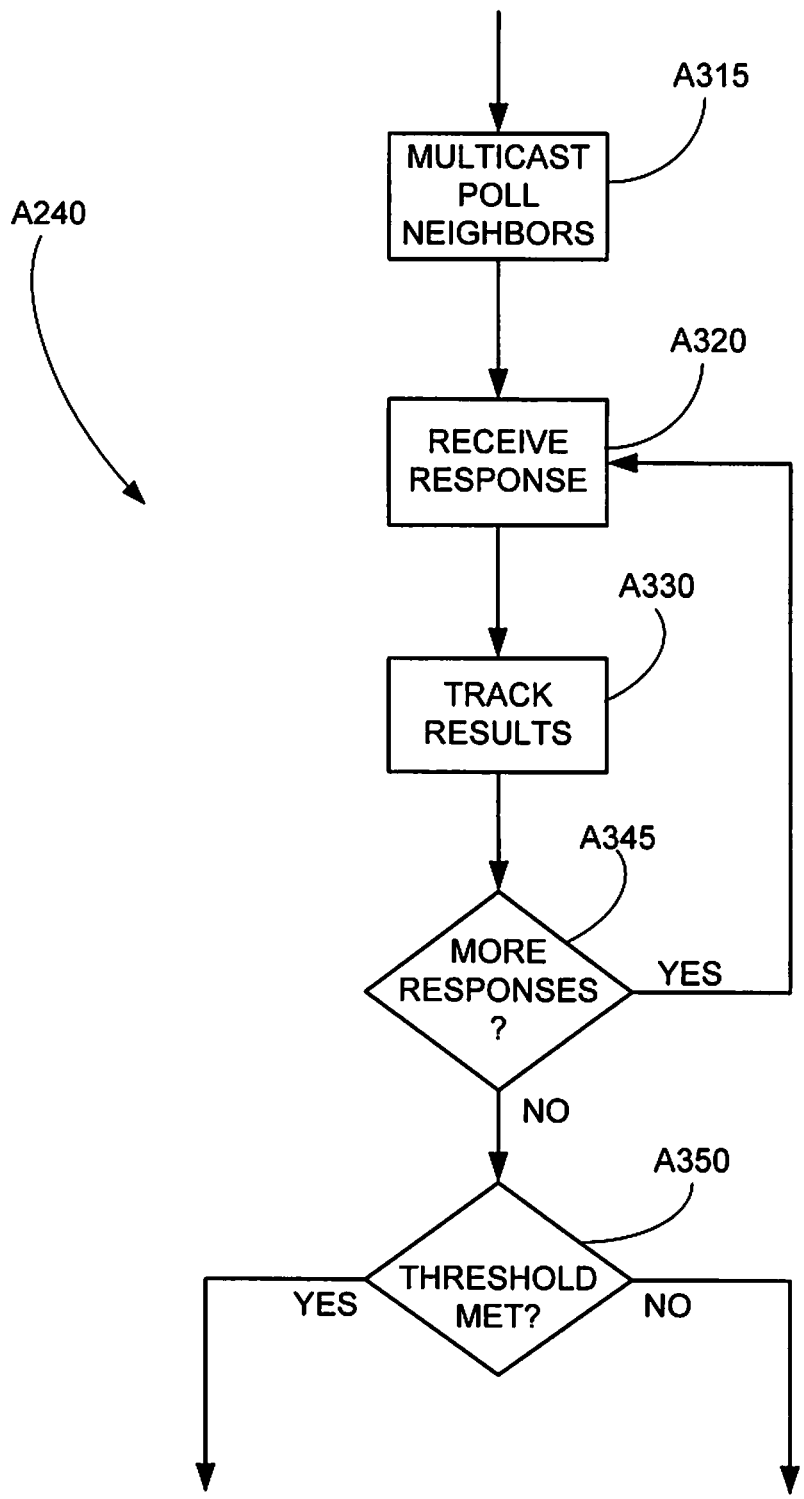
FIG. 3C illustrates another non-limiting example method of determining whether the neighboring nodes have detected related events.

FIG. 3C illustrates another non-limiting example method of determining whether the neighboring nodes have detected the same or related events. In this method, instead of individually polling each neighbor, a multi-cast polling message is sent substantially simultaneously to each of the neighboring nodes in act A315. The individual responses are received and tracked in acts A320 and A330. If there are more responses as determined in act A345, the method proceeds to act A320. If there are no more responses received, then it is determined whether the threshold has been met in act A350.

In a network such as Evolved Universal Terrestrial Radio Access Network (EUTRAN), communications between radio base stations occur over the X2 communication protocol. To allow EUTRAN nodes to poll and respond to each other, X2 messages may be defined and utilized. An example of a polling message can take the form of NEIGHBOR_EVENT_NOTIFICATION_POLL (event detector, event type, event status), and an example of a response message can take the form of NEIGHBOR_EVENT_NOTIFICATION_RESPONSE (responder, event type, event status).

Figure 4A:
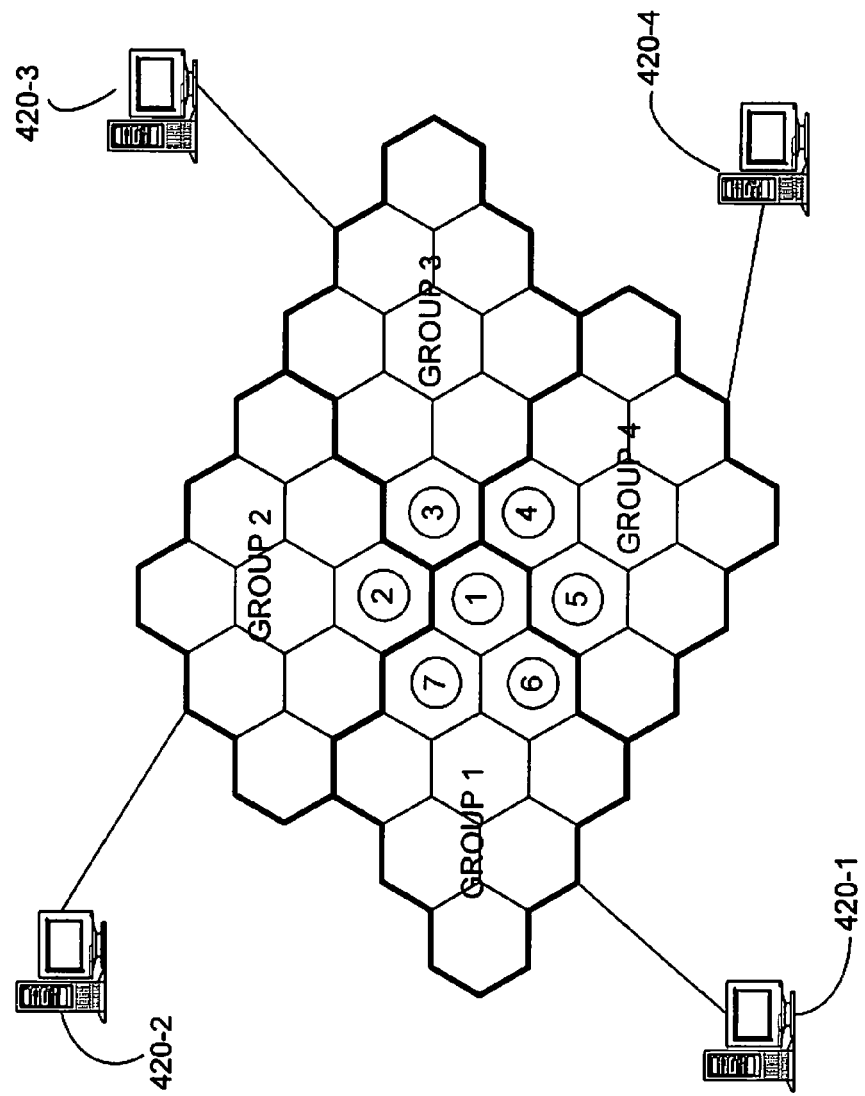
FIG. 4A illustrates a non-limiting example of network management systems managing multiple nodes partitioned into groups.

In very large or multi-vendor network configurations, the nodes can be partitioned into multiple groups of nodes as illustrated in FIG. 4A. In FIG. 4A, the nodes are partitioned into four groups 1 through 4 each being managed by corresponding network management systems 420-1, 420-2, 420-3 and 420-4. The individual nodes are not illustrated in FIG. 4A to minimize clutter. The service areas served by the individual nodes are illustrated as hexagons.

There are many reasons for partitioning the nodes. One may be geographical. Another may be due to different vendors supplying the nodes as well as supplying the network managing systems. Whatever the reason, the partitioned network introduces barriers between the nodes. As a result, alarms that originate from neighboring nodes may not be coordinated across the partitions because the nodes are separated by the partitioning barrier.

Referring back to FIG. 3A, nodes 310-2 through 310-7 are neighboring nodes of the centering node 310-1. But as seen in FIG. 4A (which illustrate corresponding service areas 1-7), only the nodes 310-6 and 310-7 are managed by the same network management system 420-1. Other neighboring nodes 310-2, 310-3, 310-4 and 310-5 are managed by different network management systems 420-2, 420-3 and 420-4. To allow for alarm coordination across the partitions, other affected management systems are notified.

Figure 4B:
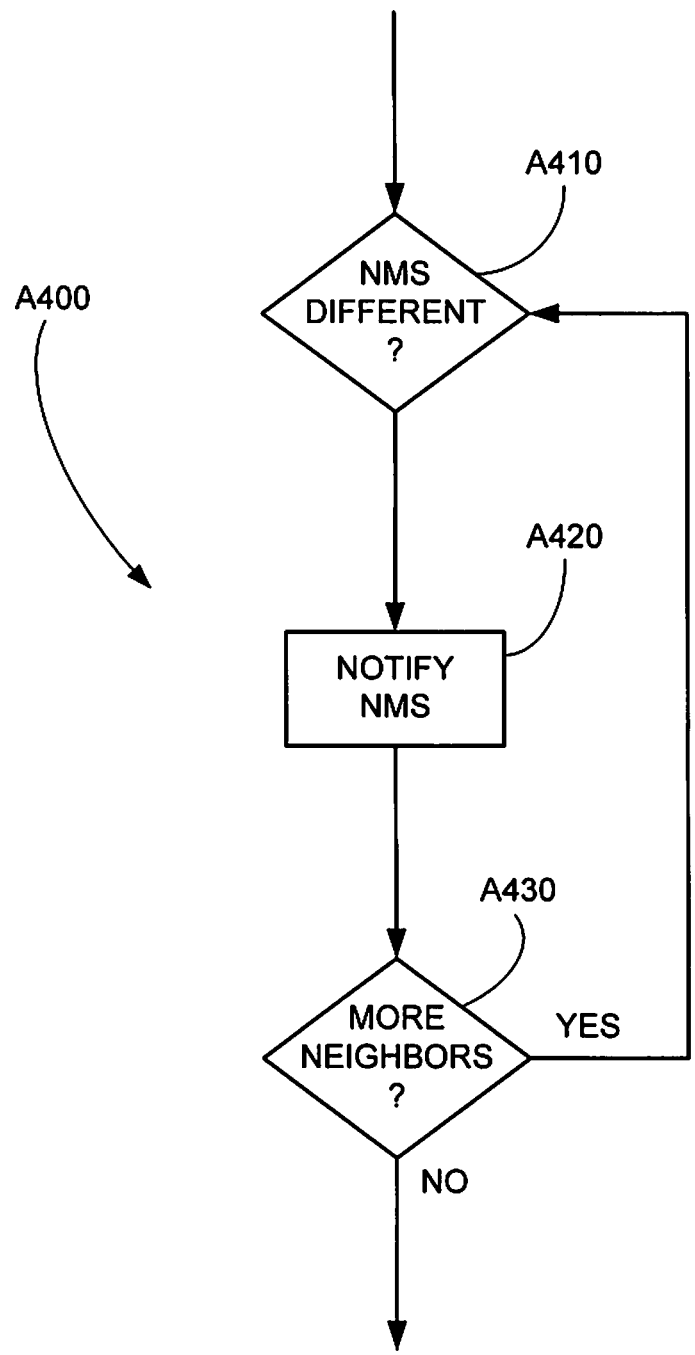
FIG. 4B illustrates a non-limiting example method of coordinating alarm handling between network management systems.

FIG. 4B illustrates a non-limiting example method of coordinating alarms between network management systems. In this method, it is determined whether a network management system managing a neighbor node is different from the current network management system in act A410. If so, the other network management system is notified of the alarm in act A420. Then it is determined whether or not there are more neighbors in act A430. If so, the method proceeds back to act A410 and the process repeats. The communication between the network management systems may be performed over Peer-to-Peer interface. Examples of such message may take the form of NEIGHBOR_BASE_SETUP (NMS instance, RBS identity, RBS position) and NEIGHBOR_BASE_EVENT_NOTIFICATION (NMS partition, RBS identity, event type, event status).

One or more non-limiting example embodiments provide at least the following advantages. An event that is not serious enough when it strikes at a single node can still be raised as an alarm to the next level if it or related events occur over multiple nodes in a network. In this way, low priority events that can collectively have serious impacts on the network performance are detected and raised so that the situations can be corrected. Further, even in partitioned network installations, every network managing systems receives enhanced status information of the environment in which their managed fleet of nodes operates. This broadens the knowledge base to act on when taking actions to solve network problems.

Although the description above contains many specificities, these should not be construed as limiting the scope of the invention but as merely providing illustrations of some of the presently preferred embodiments of this invention. Therefore, it will be appreciated that the scope of the present invention fully encompasses other embodiments which may become obvious to those skilled in the art, and that the scope of the present invention is accordingly not to be limited. All structural, and functional equivalents to the elements of the above-described preferred embodiment that are known to those of ordinary skill in the art are expressly incorporated herein by reference and are intended to be encompassed hereby. Moreover, it is not necessary for a device or method to address each and every problem described herein or sought to be solved by the present technology, for it to be encompassed hereby. No element, component, or method step in the present disclosure is intended to be dedicated to the public.

What is claimed is:

1. An event handling method, comprising:
   (a) detecting, by a node of a telecom network, an event occurring to or in the node;
   (b) determining, by the node, whether the event exceeds a predetermined severity threshold;
   (c) determining, by the node, whether the same or a related event has been detected in a predetermined number of one or more neighboring nodes of the node; and
   (d) raising an alarm corresponding to the event or a related event to a network management system managing the node when it is determined that both:
      (1) the event does not exceed the predetermined severity threshold, and
      (2) the related event or the same event that does not exceed the predetermined severity threshold has been detected in the predetermined number of the one or more neighboring nodes in act (c).

2. The method of claim 1, further comprising:
   (e) recording the event in a storage local to the node when the event is detected in act (a).

3. The method of claim 1, wherein the predetermined number is individually set for each event.

4. The method of claim 1, wherein in act (d), the alarm is raised to the network management system when the predetermined number of the one or more neighboring nodes have detected the same or the related event within a predetermined duration of each other.

5. The method of claim 1,
   wherein each event is associated with one or more potential event causes or affects one or more services, and
   wherein a first event is related to a second event if there is at least one potential event cause common to the first and second events or if there is at least one common affected service.

6. The method of claim 1, wherein act (c), comprises:
   (c.a) polling the one or more neighboring nodes;
   (c.b) receiving responses from the one or more neighboring nodes based on the polling performed in act (c.a);
   (c.c) tracking whether or not each of the one or more neighboring nodes has detected the same or the related event based on the responses received in act (c.b); and
   (c.d) determining whether the predetermined number of the one or more neighboring nodes have detected the same or the related event based on the tracking performed in act (c.c).

7. The method of claim 6, wherein in act (c.a), individual polling messages are sent to each neighboring node or a multicast polling message is sent to the neighboring nodes.

8. The method of claim 6,
   wherein in act (c.a), the one or more neighboring nodes are polled via a polling message over a logical interface defining signaling procedures between nodes, or
   wherein in act (c.b), the responses are received from the one or more neighboring nodes via response messages over the logical interface, or
   both.

9. The method of claim 1, wherein at least one of the one or more neighboring nodes is managed by a different network management system the method further comprising:
   (f) notifying the different network management system correspondingly managing each of the at least one of the one or more neighboring nodes of the alarm.

10. The method of claim 9, wherein in act (f), the different network management system is notified via a peer-to-peer message.

11. A node of a telecom network, comprising:
    local storage; and
    one or more processors configured to:
       detect an event;
       determine whether the event exceeds a predetermined severity threshold;
       determine whether a predetermined number of one or more neighboring nodes have detected the same or a related event; and
       raise an alarm corresponding to the event or a related event to a network management system that manages the node when it is determined that both
          (1) the event does not exceed the predetermined severity threshold, and
          (2) the predetermined number of the one or more neighboring nodes have detected the related event or same event that does not exceed the predetermined severity threshold.

12. The node of claim 11, wherein at least one of the one or more processors is configured to record the event in the local storage when the event is detected.

13. The node of claim 11, wherein at least one of the one or more processors is configured to raise the alarm to the network management system when it is determined that the predetermined number of the one or more neighboring nodes have detected the same or the related event within a predetermined duration of each other.

14. The node of claim 11, wherein at least one of the one or more processors is configured to determine whether the predetermined number of the one or more neighboring nodes have detected the same or the related event by:
    polling the one or more neighboring nodes;
    receiving responses from the one or more neighboring nodes based on the polling;
    tracking whether or not each of the one or more neighboring nodes have detected the same or the related event based on the responses received; and
    determining whether the predetermined number of the one or more neighboring nodes have detected the same or the related event based on the tracking.

15. The node of claim 14, wherein at least one of the one or more processors is configured to poll the one or more neighboring nodes by sending individual polling messages to each neighboring node or sending a multicast polling message to the neighboring nodes.

16. The node of claim 14, wherein at least one of the one or more processors is configured to:
  poll the one or more neighboring nodes via a polling message over a logical interface defining signaling procedures between nodes, or
  receive the responses from the one or more neighboring nodes via response messages over the logical interface, or both.

17. A network management system, comprising a NMS alarm handler connected to a node of a telecom network, wherein the node is configured to:
  (a) detect an event occurring to or in the node,
  (b) determine whether the event exceeds a predetermined severity threshold,
  (c) determine whether the same or a related event has been detected in a predetermined number of one or more neighboring nodes, and
  (d) raise an alarm corresponding to the event or a related event to the network management system when it is determined that both:
    (1) the event does not exceed the predetermined severity threshold, and
    (2) the related event or the same event that does not exceed the predetermined severity threshold has been detected in the predetermined number of the one or more neighboring nodes in act (c),
  wherein the NMS alarm handler is configured to receive the alarm from the node,
  wherein at least one of the one or more neighboring nodes is managed by a different network management system, and
  wherein the NMS alarm handler is configured to notify the different network management system correspondingly managing each of the at least one of the one or more neighboring nodes of the alarm.

18. The network management system of claim 17, wherein the NMS alarm handler is configured to notify the different network management system via a peer-to-peer message.

\* \* \* \* \*

UNITED STATES PATENT AND TRADEMARK OFFICE
CERTIFICATE OF CORRECTION

PATENT NO. : 8,605,601 B2  
APPLICATION NO. : 12/922335  
DATED : December 10, 2013  
INVENTOR(S) : Isaksson et al.

Page 1 of 1

It is certified that error appears in the above-identified patent and that said Letters Patent is hereby corrected as shown below:

On the Title Page, Item (75), under "Inventors", in Column 1, Line 1, delete "Molnlycke" and insert -- Mölnlycke --, therefor.

On the Title Page, Item (75), under "Inventors", in Column 1, Line 3, delete "Per Stahle," and insert -- Per Ståhle, --, therefor.

On the Title Page, Item (56), under "OTHER PUBLICATIONS", in Column 2, Line 1, delete "Hsin et al," and insert -- Hsin et al., --, therefor.

In the Claims

In Column 9, Line 57, in Claim 6, delete "act (c)," and insert -- act (c) --, therefor.

In Column 10, Line 33, in Claim 11, delete "both" and insert -- both: --, therefor.

Signed and Sealed this  
Twenty-ninth Day of July, 2014

Michelle K. Lee  
*Deputy Director of the United States Patent and Trademark Office*